United States Patent [19]

Fleck

[11] Patent Number: 4,727,449

[45] Date of Patent: Feb. 23, 1988

[54] FILAMENT BYPASS CIRCUIT

[75] Inventor: William C. Fleck, Oakland Gardens, N.Y.

[73] Assignee: Chiu Technical Corporation, Kings Partk, N.Y.

[21] Appl. No.: 914,139

[22] Filed: Oct. 1, 1986

[51] Int. Cl.[4] .......... H02H 9/00

[52] U.S. Cl. .......... 361/54; 361/58; 340/642; 340/652; 315/122; 315/92; 315/132

[58] Field of Search .......... 361/54, 56, 58, 91, 361/86; 340/590, 641, 642, 652, 660; 315/89, 91, 92, 120, 122, 123, 132, 133, 135, 186, 189

[56] References Cited

U.S. PATENT DOCUMENTS

| | | | |
|---|---|---|---|
| 325,391 | 9/1885 | Brown | 315/192 |
| 1,024,495 | 4/1912 | Booth | 315/123 |
| 2,072,337 | 3/1937 | Kamm | 315/122 |
| 2,503,677 | 4/1950 | McHenry et al. | 315/132 |
| 2,760,120 | 8/1956 | Fisherman | 315/92 |
| 3,267,290 | 8/1966 | Diebold | 315/190 |
| 3,657,594 | 4/1972 | Latal | 315/190 |
| 3,968,398 | 7/1976 | Lehmann et al. | 315/185 |
| 4,006,412 | 2/1977 | Campbell et al. | 315/185 |
| 4,091,307 | 5/1978 | McNamara, Jr. | 315/135 X |
| 4,170,004 | 10/1979 | Portinaro | 315/135 |
| 4,190,830 | 2/1980 | Bell | 315/82 |
| 4,222,047 | 9/1980 | Finnegan | 315/136 |
| 4,223,248 | 9/1980 | Tong | 315/185 |
| 4,227,228 | 10/1980 | Cheng | 315/185 |
| 4,425,605 | 1/1984 | Cheng | 315/185 |
| 4,587,588 | 5/1986 | Goldstein | 361/54 X |

*Primary Examiner*—A. D. Pellinen
*Assistant Examiner*—Todd E. DeBoer
*Attorney, Agent, or Firm*—Leonard Belkin

[57] ABSTRACT

A filament bypass circuit for use with a string of lamps in series capable of continuing current flow when a lamp in the string fails. Each lamp is provided with a shunt circuit consisting of a series circuit of a diode and a silicon bilateral voltage triggered switch. The switch becomes conductive upon the application of a substantial increase in voltage from the A.C. source and remains conductive until there is an interruption of current flow or current flow drops below its required holding value. The diode insures that during continued operation after a failure there will not be an excessive voltage applied to the remaining lamps, and also serves as an indicator of a failed lamp.

7 Claims, 2 Drawing Figures

FILAMENT BYPASS CIRCUIT

BACKGROUND OF THE INVENTION

This invention relates to a filament bypass circuit and more particularly to a filament bypass circuit employing a voltage operated switch to maintain current flow when the filament fails.

In strip lighting configurations a plurality of lights are strung in series, for example, as in Christmas tree and other ornamental applications. When one bulb fails, the whole string of lamps goes dark. To replace the defective bulb it is necessary to inspect and check each bulb. In many of these arrangements, the bulbs are inexpensive and the inconvenience of locating the failed bulb may be acceptable. In certain other situations, this inconvenience may be unacceptable, with the result that a variety of arrangements for identifying the defective bulb are in existence, and in some configurations there is provision for maintaining the remaining bulbs lit until the defective bulb can be changed.

In some cases, it is necessary or desirable to use special light bulbs having characteristics which are required in particular applications, and an example of such bulbs is the halogen lamp which due to the presence of a halogen gas in the envelope permits higher intensity current flow through the filament with the result that much brighter light is obtainable in a very small bulb size as well as producting a color rendition which is highly desirable in certain applications. Examples of such specialized applications would be lighting of works of art in museums, lighting in discotheques, and stage lighting. The halogen lamp may be used alone or in strings. The halogen lamp requires a low voltage, such as 12 volts, for its operation, and when used alone or in parallel in order to avoid the problem of locating the failed bulb, a bulky and heavy transformer is required to reduce the voltage.

When the halogen lamp is employed in strings, the reduced voltage is obtainable by connecting them in series so that the drop across each lamp is at the rated value. However, in the case of the failure of a single lamp, the whole string goes dark without indicating which lamp has failed. When a bypass circuit, of design heretofore available, is employed to maintain the other lamps lit after a failure has occurred it may not even be noticeable that one lamp is dark, since there is no indication of such a failure other than one lamp being dark. In the environments where halogen lamps are or may be employed, it may not be immediately noticeable that a failure has occurred. In addition, in many of the bypass circuits known up to now, continuation of current flow results in an increased voltage across the remaining lamps with the result that the life of those lamps may be shortened by a very substantial amount. In the high intensity halogen lamp, small increases over rated voltage could cause a considerable shortening of the lives of the remaining lamps. Since the halogen as well as other specialized lamps may be quite expensive, present arrangements for maintaining current flow are not completely satisfactory.

SUMMARY OF THE INVENTION

In this invention, there is provided a filament bypass circuit for use with lamps which overcomes or reduces significantly the problems heretofore associated with arrangements designed to maintain current flow after a failure has occurred. In addition, where each bulb is supplied in a parallel arrangement to identify the failure of a single bulb, the present invention makes it possible to avoid the use of the transformer.

In accordance with a preferred embodiment of this invention, there is provided a string of lamps connected electrically in series in which each lamp is provided with a bypass circuit comprising a silicon bilateral voltage triggered switch in series with a diode. The bilateral voltage triggered switch is an element which closes only when a certain predetermined voltage is reached, which would occur with the failure of the bulb, and the voltage drop across the open filament reaches circuit voltage. The diode, in permitting flow in one direction only, reduces effective current flow so that all the remaining lamps will have diminished light output which will call attention immediately to the failed light as well as avoid the application of a greater voltage which would adversely affect the life of the remaining filaments. Interruption of the application of the voltage source to replace the defective lamp will cause the switch to open and resume normal operation once the lamp is replaced.

It is thus a principal object of this invention provide a filament bypass circuit of improved design and greater usefulness.

Other objects and advantages of this invention will hereinafter become obvious from the following detailed description of the preferred embodiments of this invention.

DETAILED DESCRIPTION OF THE PREFERRED EMBODIMENTS

Figure 1:
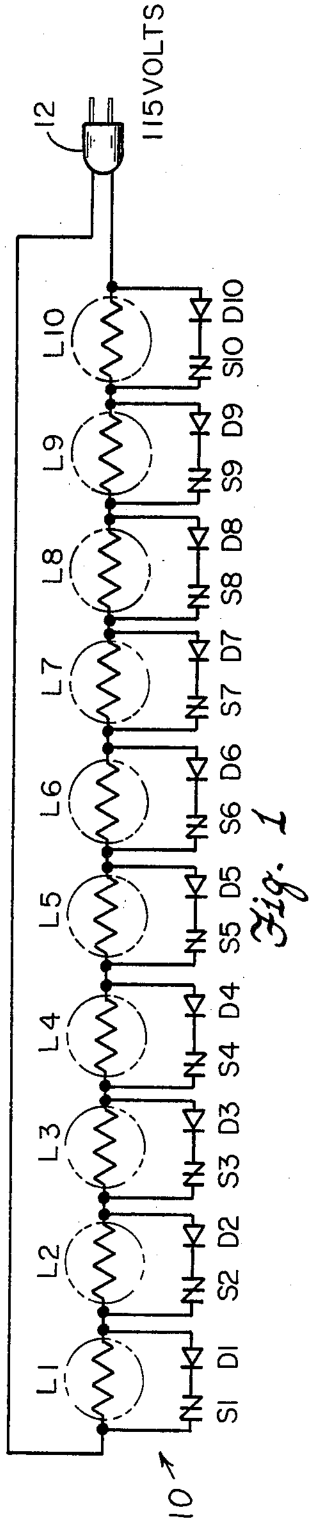
FIG. 1 is a circuit diagram showing ten incandescent lamps in series incorporating a preferred embodiment of this invention.

Referring to FIG. 1, there is illustrated a circuit 10 consisting of ten filament operated lamps $L_1$ through $L_{10}$ connected in series across a voltage source of 115 volts A.C. through a plug 12. Each of the lamps thus is receiving approximately 12 volts, its rated requirement.

Across each of lamps $L_1$ through $L_{10}$, there is provided an identical bypass or shunt circuit. Referring to lamp $L_4$, across its filament is connected in series a diode $D_4$ and a silicon bilateral voltage triggered switch $S_4$. Such switches are conventional and available commercially. For example, switches of this type are sold under the trademark SIDAC by Teccor Electronics, Inc. This switch turns on and conducts when a particular voltage drop across it appears, and remains in a low on-state voltage. That is, it will maintain current flow even through the voltage drop across it drops, as would be expected in this circuit.

Should lamp $L_4$ fail in service by its filament opening with the result that current flow through all lamps will cease, the voltage drop across switch $S_4$ will increase substantially, and switch $S_4$ will begin to conduct, returning all other lamps to the on state. However, due to the presence of diode $D_4$, which will almost halve the effective voltage due to its blocking flow in one direction, the voltage drop across each of the remaining lamps will be less, reducing the risk of filament failure in each of the others, and signalling by the diminished light output that there was a light failure requiring a bulb replacement. Without the presence of the diode in the bypass circuit, the voltage across each lamp would go from 12 volts to over 13 volts, an increase in excess of ten per cent which could result in additional bulb failures.

Plug 12 is then disconnected from its power source and bulb $L_4$ replaced, with the result that circuit 10 is returned to normal operation.

Figure 2:
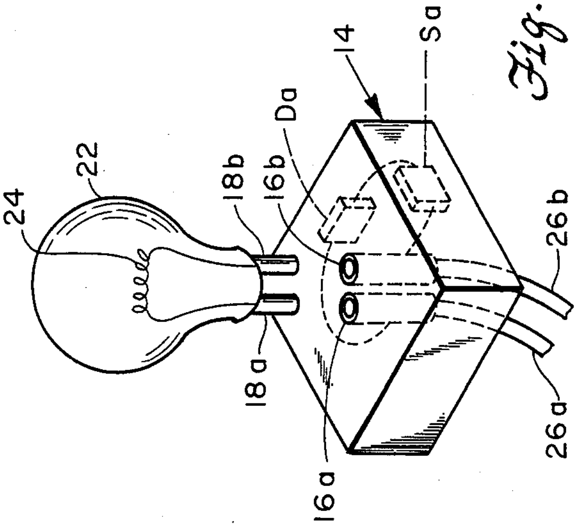
FIG. 2 is an exploded view of a lamp with a lamp socket in which is embedded a preferred embodiment of this invention.

The bypass circuit which has just been described may be incorporated as part of the socket into which each lamp is threaded or plugged. This arrangement is illustrated in FIG. 2 where is shown a light socket 14 consisting of a block of dielectric material in which is embedded a pair of hollow sleeve contacts 16*a* and 16*b* to receive the prongs 18*a* and 18*b* of a halogen lamp 22 having a filament 24. A pair of electrical conductors 26*a* and 26*b* making contact with contacts 16*a* and 16*b* extend down from socket 14. The bypass circuit consisting of diode $D_a$ and silicon bilateral voltage triggered switch $S_a$ are embedded in socket 14 connected by conductors as illustrated across contacts 16*a* and 16*b*.

It is thus seen that there has been provided a unique arrangement for maintaining current flow in a series connected circuit of lamps while at the same time preventing voltages from increasing on the remaining functioning lamps of the circuit and indicating that one lamp has failed.

While only certain preferred embodiments of this invention have been described, it is understood that many changes and variations thereof are possible without departing from the principles of this invention as defined in the claims which follow.

What is claimed is:

1. A string set of series-connected incandescent lamps used with a voltage source of A.C., the improvement in which each lamp in said set is provided with a bypass circuit consisting of a series arranged diode for limiting current flow in one direction only and switch means non-conductive during normal operation of said string set and becoming conductive upon the application of a substantial increase in voltage across said lamp due to a a filament failure in said lamp, said diode and switch means being connected in parallel to each lamp said switch means remaining conductive until current drops below its required holding current level, said diode blocking current flow in one direction thereby providing a substantially reduced current flow through said set and diminishing light output in all lamps in said set as a signal of said failure the said substantially reduced current flow being above said required holding current level whereby removal of said voltage source and replacement of the failed lamp will reestablish normal lamp operation within said set upon reapplication of said voltage source.

2. The string set of claim 1 in which said switch means is a silicon bilateral voltage triggered switch.

3. The string set of claim 1 in which each of said lamps is a halogen incandescent lamp.

4. A socket used with a source of A.C. voltage and an incandescent lamp having a pair of spaced conductive prongs comprising a pair of spaced female conductive members for receiving said prongs, the improvement comprising a series circuit mounted within said socket shunting said female conductive members, said series circuit comprising a diode permitting current flow in one direction only and switch means non-conductive during normal operation of said lamp and becoming conductive upon the application of a substantial increase in A.C. voltage as the result of a filament failure in said lamp and remaining conductive until current flow drops below the required holding current level of said switch means, said diode and switch means being connected in parallel with said lamp, said diode effectively reducing current flow through said socket but allowing current flow above said holding current level, whereby interuption of the application of said voltage source and removal of the aforesaid lamp with said filament failure causing said switch means to return to its non-conductive state and replacement of said lamp causing said socket to return to normal operation.

5. The socket of claim 4 in which said switch means is a silicon bilateral voltage triggered switch.

6. Apparatus for maintaining current flow in a string set of series-connected incandescent lamps upon failure of the filament in one of said lamps and signaling said failure by diminishing the light output of the remaining lamps, said apparatus comprising a plurality of lamps series connected across a source of A.C., a bypass circuit means for each of said lamps comprising a diode and switch means in series said diode and switch means connected in parallel with said lamp, said bypass circuit means being non-conductive during normal operation of its associated lamp, said switch means becoming conductive upon the full application of voltage from said A.C. source as a result of the failure of its associated lamp, said diode reducing current flow by about one half thereby diminishing light output of all lamps in said string set to signal a lamp failure, the reduced current flow being above the required holding current level of said switch means, the removal of said voltage source causing said switch means to become non-conductive and replacement of the failed lamp returning said string set to normal operation.

7. The method of operating a string set of incandescent lamps series connected across a source of A.C. voltage comprising the steps of bypassing each lamp with a diode and switch means in series, said diode and switch means connected in parallel with each lamp, said switch means becoming conductive upon the full application of said A.C. voltage due to a failure in its associated lamp to maintain current flow through said string set, said diode reducing current flow through said string set sufficient to cause diminished light output of all lamps to indicate the existance of a lamp failure but not sufficient to terminate conduction through said switch means, followed by removing said source of A.C. voltage to terminate conduction of said switch means, and replacing the failed lamp, and applying said A.C. voltage to said string set to return the latter to normal operation.

* * * * *